United States Patent
Son et al.

(10) Patent No.: US 7,369,751 B2
(45) Date of Patent: May 6, 2008

(54) SYSTEM AND METHOD FOR RECORDING BROADCASTING PROGRAMS

(75) Inventors: Hyeong Ho Son, Kyonggi-do (KR); Eunsam Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1102 days.

(21) Appl. No.: 10/242,418

(22) Filed: Sep. 13, 2002

(65) Prior Publication Data

US 2003/0067886 A1 Apr. 10, 2003

(30) Foreign Application Priority Data

Sep. 13, 2001 (KR) .................... 10-2001-0056546

(51) Int. Cl.
*H04N 5/91* (2006.01)
(52) U.S. Cl. .................... 386/83; 386/95; 725/142
(58) Field of Classification Search ............... 386/46, 386/83, 125, 95; 370/260; 725/142
See application file for complete search history.

(56) References Cited

U.S. PATENT DOCUMENTS 6,233,389 B1* 5/2001 Barton et al. ............ 386/46
6,868,225 B1* 3/2005 Brown et al. ............ 386/83
2002/0174430 A1* 11/2002 Ellis et al. ............... 725/46

FOREIGN PATENT DOCUMENTS

KR 10-1999-0036106 5/1999
KR 10-2001-0052396 A 6/2001

* cited by examiner

*Primary Examiner*—Marsha D. Banks-Harold
*Assistant Examiner*—Christopher Findley
(74) *Attorney, Agent, or Firm*—Birch, Stewart, Kolasch & Birch, LLP (57) ABSTRACT

A system and a method for recording digital broadcasting programs are disclosed. The system executes the clipping function that allows a user to select a portion of a recorded video signal, time-shifted video signal, or real-time broadcasting video signal through a guide bar in an OSD form, and stores only the video signal of the selected portion in an HDD. This prevents the HDD from being unnecessarily wasted and allows the user to easily perform the clipping function. Even a time-shifted program is stored in the HDD through the clipping function so that the user can reproduce the time-shifted program whenever he wants to watch it.

26 Claims, 4 Drawing Sheets

SYSTEM AND METHOD FOR RECORDING BROADCASTING PROGRAMS

BACKGROUND OF THE INVENTION

1. Field of the Invention

The present invention relates to a system and a method for recording and reproducing broadcasting programs, and more particularly, to a recording system and a recording method, capable of selectively editing and storing a part of a program.

2. Background of the Related Art

In general, a video cassette recorder employing a tape medium has been widely used as a conventional system for recording analog broadcasting signals. However, upon the advent of the age of digital broadcast that is advantageous more than analog broadcast, a variety of recording media appear. These recording media include a digital VCR, a hard disc driver (HDD), an optical disc and the like. Among these recording media, the HDD has recording capacity of about tens Giga-bytes similar to that of the tape medium with the help of recent rapid technical development.

With the propagation of digital TV receivers for digital broadcast, DTV receivers having a variety of additional functions to satisfy user's various demands are being provided. Especially, the personal video recorder (PVR) function, one of the noticeable DTV additional functions, provides a variety of reproduction functions using a large-capacity HDD. The PVR stores audio and video information digitally, distinguished from the conventional analog VCR tape, to secure picture quality without having loss of information even in the event of unlimited times of recording and reproduction.

The PVR enables operations including normal play, Fast Forward, Slow Forward, Fast Rewind and Slow Rewind of broadcasting programs stored according to a function similar to the convention VCR or currently being buffered. In addition, the PVR has a time shift function that allows a user to simultaneously store and play the broadcasting program he is currently watching. For example, in case that the user has a phone call while he is watching a broadcasting program, when he pushes a button for time shift of a remote control (for example, pause button), broadcasting streams received after he pushes the button are stored in a HDD. When the user pushes a play button after he hangs up, he can watch scenes following the pause scene, which are stored in the HDD. That is, recording and reproduction are simultaneously carried out at a predetermined time interval.

Furthermore, reservation recording and prompt recording are available. When the user records a program using the reservation recording or prompt recording, he usually performs recording by time or programs. For example, in case that the user records a program from 9:50 to 10:50, this data corresponding to one hour may include advertisements or a part of another program the user does not want to record. Moreover, the recorded data may contain only a part of the program he wants to record. That is, the recorded contents can include contents the user does not want. Thus, the user desires to store only a part of the recorded contents he wants.

Additionally, the HDD has a limited capacity. Accordingly, if even the contents the user does not want are stored in the HDD, its capacity is unnecessarily wasted. Furthermore, in case of the time shift, the contents stored in the HDD are deleted from the HDD once they are reproduced. This cannot satisfy a user who wants to store a part or the whole part of time-shifted contents in the HDD.

SUMMARY OF THE INVENTION

Accordingly, the present invention is directed to a system and method for recording broadcasting programs that substantially obviate one or more problems due to limitations and disadvantages of the related art.

An object of the present invention is to provide a system and a method for recording broadcasting programs, capable of selectively storing only a part of recorded data or time-shifted data that a user requires in an HDD.

Another object of the present invention is to provide a system and a method for recording broadcasting programs, capable of selectively storing a part of real-time broadcasting data that a user requires in an HDD.

In the present invention, a partial recording/editing function for recording only a part of the real-time broadcasting data, recorded data or time-shifted data in the HDD is called clipping function for convenience of explanation.

The term "clipping" is exemplary and it can be replaced by any term that appropriately explains the aforementioned function. In addition, different terms can be used for three different cases: selectively storing only a part of the real-time broadcasting data in the HDD; selectively storing only a part of the recorded data in the HDD; and selectively storing only a part of the time-shifted data. For example, the method of selectively recording only a part of the recorded data in the HDD can be called "editing function". Here, the term is not limited to the above-described one and it can be replaced with another one.

To accomplish the objects, the present invention is characterized by a clipping function that allows a user to select a part of a recorded video signal or a time-shifted video signal, which are being reproduced, or a real-time broadcasting video signal and to store the selected part of the video signal in an HDD. Here, a guide bar is displayed in an OSD form in order to allow the user to select a clipping region of the displayed video signal. A desired clipping region is set in such a manner that a cursor is placed on a clipping start position and a completion position on the guide bar and a clipping start key and a completion key are respectively inputted. The guide bar can be displayed in a distinct color to allow the user to easily recognize the set clipping region.

To accomplish the objects of the present invention, there is provided a broadcasting program recording system, comprising a storage medium (i.e., HDD) for storing a corresponding broadcasting signal when a recording or time shift function is set; a key input unit through which a user inputs a clipping start key and a completion key at the start position and end potion of a clipping region in order to set the clipping region in a broadcasting signal being displayed, the key input unit transmitting user's commands in wired or wireless; an application for controlling the entire system in order to perform operations according to commands of the key input unit; an OSD unit for displaying a guide bar in an OSD form on a predetermined position of a screen under the control of the application in order to display the state of the broadcasting signal currently being displayed, the clipping region being distinctively indicated on the guide bar; an engine for processing a video signal reproduced from the storage medium or a real-time broadcasting video signal to display the processed signal under the control of the application, the engine controlling only broadcasting signals of the clipping region to be stored in the storage medium when the user sets the clipping region through the guide bar; and a file system for managing information about files stored in the storage medium, the file system generating a new file name and correcting existing file information when the broadcasting signals of the clipping region have been stored.

The OSD unit displays the clipping region and other regions in different colors under the control of the application, to allow the user to recognize the clipping region.

The start key and completion key for clipping are allocated to one key of the key input unit and the clipping region is set by toggling the key. Otherwise, the start key and completion key for clipping are respectively allocated to different keys of the key input unit, to set the clipping region.

The broadcasting signal of the clipping region is a broadcasting signal that is stored in the storage medium through the recording function and then reproduced.

The broadcasting signal of the clipping region is a broadcasting signal that is stored in the storage medium through the time shift function and then reproduced.

The broadcasting signal of the clipping region is a broadcasting signal received through a channel in real time.

The OSD unit displays file information stored in the storage medium in a list form with reference to the file system under the control of the application, and the user selects files he wants to merge into one file from files of the list and determines merging order of the selected files.

To accomplish the objects of the present invention, there is also provided a method of recording broadcasting programs, comprising the steps of displaying a guide bar on a predetermined position of a TV screen in an OSD form and indicating the state of a broadcasting signal currently being displayed on the guide bar; a user inputting a start key and a completion key for clipping at a desired clipping start point and an end point on the guide bar, to set a clipping region, when the user wants to set the clipping region from the displayed broadcasting signal; discriminating the clipping region from other regions on the guide bar when the clipping region is set in the above step; and storing only the broadcasting signal of the clipping region in the storage medium and updating file information of the file system when the clipping region is set in the above step.

To accomplish the objects of the present invention, there is further provided a method of recording broadcasting programs, comprising the steps of displaying a guide bar on a predetermined position of a TV screen in an OSD form and indicating the state of a broadcasting signal currently being displayed on the guide bar; a user inputting a start key and a completion key for clipping at a desired clipping start point and a completion point on the guide bar, to set a clipping region, if the user wants to set the clipping region when a broadcasting signal stored in the storage medium is reproduced, the user repeating this process to set a plurality of clipping regions; discriminating the color of the clipping region from the color of other regions on the guide bar when the clipping region is set in the above step; and storing only the broadcasting signal of the clipping region in the storage medium and updating the file information of the file system when the clipping region is set in the aforementioned step.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
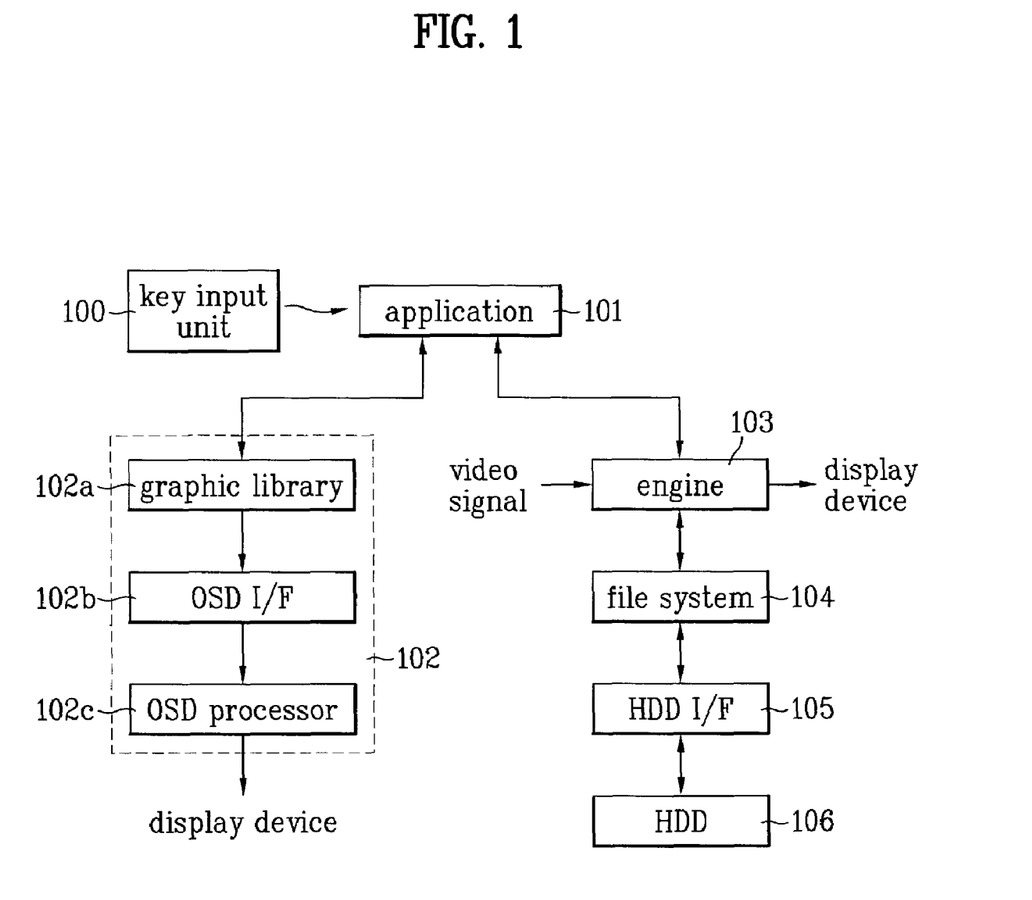
FIG. 1 is a block diagram of a digital TV system having a PVR function according to the present invention.

FIG. 1 is a block diagram of a digital TV system having a PVR function according to the present invention. Referring to FIG. 1, the digital TV system includes an application 101 for controlling the entire operations of the system according to user commands inputted through a key input unit 100 such as a remote control, and an OSD unit 102 for displaying characters, graphic and a guide bar for indicating the state of an image currently being displayed on the TV screen and the like on the TV screen under the control of the application 101. The system further includes an engine 103 for processing a broadcasting signal received through a channel (the air, a cable or a satellite) or a broadcasting signal reproduced from an HDD 106 under the control of the application 101 to display the processed signal on the TV screen, storing data in the HDD 106 or performing the clipping function using the guide bar, a file system 104 managing information of files stored in the HDD 106 and being updated according to the control of the engine 103 when there is generated a variation in the data stored in the HDD 106, and an HDD interface 105 serving as a driver for performing interfacing between the file system 105 and the HDD 106.

The OSD unit 102 includes a graphic library 102a for programming OSD characters, graphic and the like to be displayed on the screen under the control of the application 101, and an OSD processor 102c for setting the OSD characters, graphic and guide bar in an OSD memory (not shown) according to programming of the graphic library 102a to display them on the TV screen. An OSD interface 102b is a driver that interfaces the graphic library 102a and the OSD processor 102c with each other.

Figure 2:
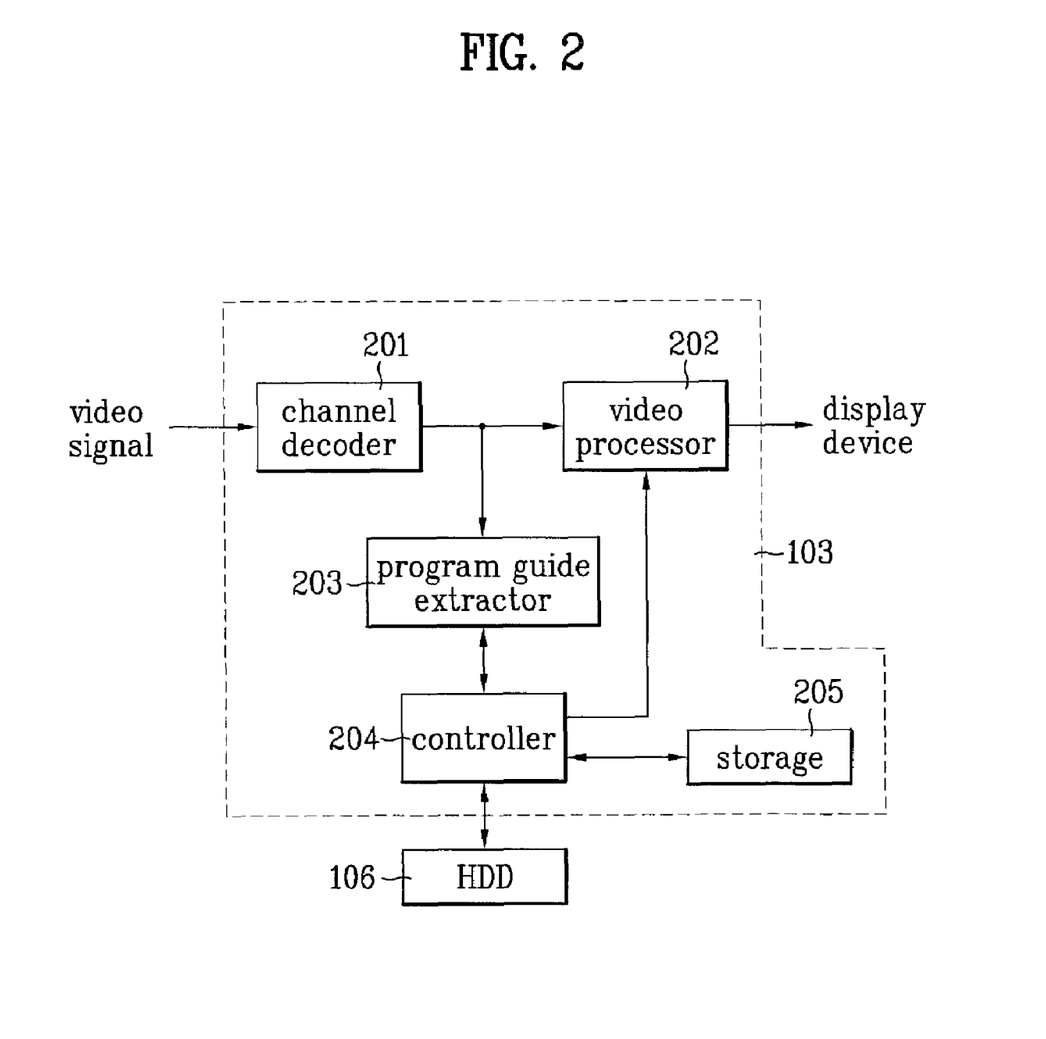
FIG. 2 illustrates the internal configuration of the engine of FIG. 1.

FIG. 2 illustrates the internal configuration of the engine 103, which roughly shows a part related with the present invention.

Referring to FIG. 2, the engine 103 includes a channel decoder 201 for removing various noises generated in a channel from the broadcasting signal received through the channel (the air, a cable or a satellite), a video processor 202 for extracting a video signal (including audio) from the broadcasting signal outputted from the channel decoder 201 to output it to a display device or outputting a video signal reproduced from the HDD 106 to the display device, a program guide extractor 203 for extracting additional information data such as program guide information from the broadcasting signal outputted from the channel decoder 201, a storage 205 for storing the program guide information extracted by the program guide extractor 203, and a controller 204 for controlling decoding, displaying and reproducing of the video signal and extraction and storing of the program guide information.

The present invention constructed as above is characterized by the clipping function that allows a user to select only a partial section of a recorded video signal or time-shifted video signal while the signal is being reproduced and stores only the video signal corresponding to the selected section in the HDD. Furthermore, the present invention performs the clipping function for a real-time broadcasting video signal such that a user selects a partial section of the video signal and only the video signal of the selected section is stored in the HDD.

Here, the guide bar in the OSD form is used in order to allow the user to select a clipping section of a video signal displayed on the TV screen. The guide bar is generated by the OSD unit 102 under the control of the application 101 and displayed on a designated position of the TV screen.

The guide bar is linked with a video signal being reproduced or a real-time broadcasting video signal to display the state of the signal. The state of the signal can be indicated using colors on the guide bard. For example, a section that has already been reproduced is represented in blue and a section that has not been yet reproduced is indicated in red. The colors of the guide bar can be varied by its designer.

Additionally, the guide bar can be automatically displayed in the process of reproducing the video signal or real-time broadcast. Otherwise, the guide bar can be displayed only when the system judges that it is required or the user selects it. Display of the guide bar depends on the system designer. For example, the guide bar can be automatically displayed in the process of recording or reproducing a video signal or during real-time broadcast, changed into an icon form after a lapse of predetermined time, and then displayed again on the TV screen according to judgement of the system or when the user selects the icon.

The guide bar can be in any shape that allows a user to recognize the state of an image currently being displayed on the TV screen and to select an arbitrary position of the guide bar.

Figure 4:
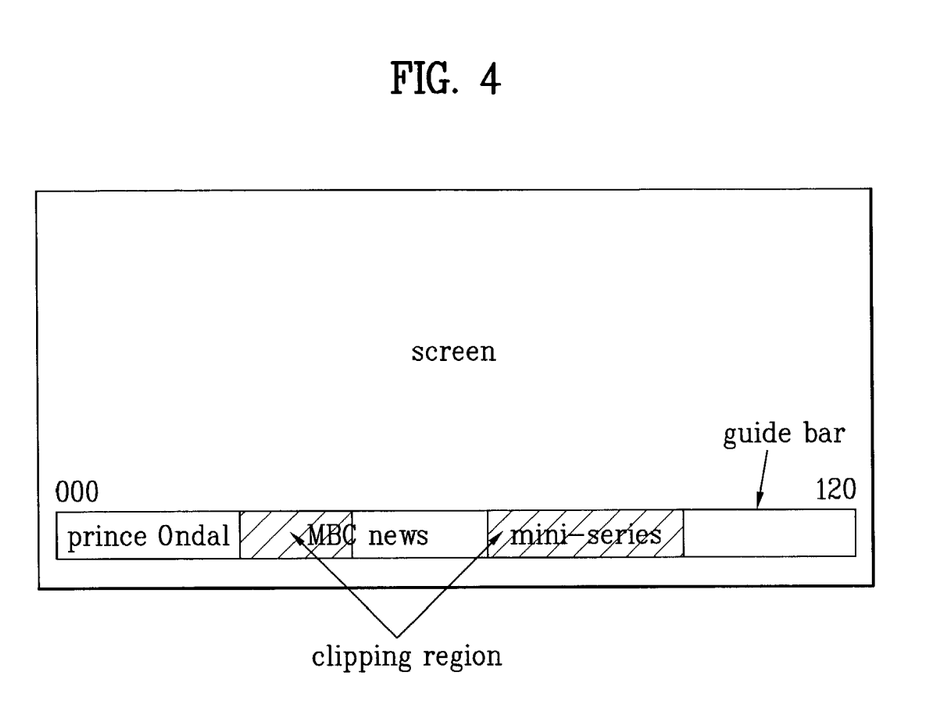
FIG. 4 illustrates an example of a display screen showing a clipping region according to the present invention.

FIG. 4 illustrates an example of the guide bar. The clipping function of the present invention will be explained with reference to the guide bar.

Referring to FIG. 4, the guide bar has a horizontally long shape, displayed at a lower part of the TV screen. This guide bar indicates the display states of video signals of a reproduction file selected by a user using different colors. If the length of the reproduction file is two-hours long, the guide bar has its length corresponding to 120 minutes.

For example, if the selected reproduction file is currently being displayed on the TV screen for ten minutes approximately, the section of the guide bar, corresponding to ten minutes, is indicated in a different color so that the user can recognize it. Here, the start position and completion position of a clipping region on the guide bar are set using the key input unit 100 such as a remote control.

Specifically, a first clipping region is set in such a manner that a cursor (or pointer) is placed on a desired clipping start position on the guide bar and a clipping start key is pushed, and then the cursor is located on a desired clipping completion position and a clipping completion key is pushed. Another clipping region can be set by repeating this process.

Here, the clipping start key and the completion key are allocated to one key on a remote control and used in the toggling manner, or they are respectively assigned to two keys on the remote control. If a recording key is allocated to the clipping start key and completion key, for instance, a user places the cursor on a desired clipping start position on the guide bar and pushes the recording key, and then he locates the cursor on a desired clipping completion position and pushes the recording key again, thereby setting a clipping region.

A user command inputted in wired or wireless through the key input unit 100 enters the application 101. Then, the application 101 transmits/receives data to/from the OSD unit 102 or engine 103 according to the user command or a system command to perform the corresponding command.

Let it be assumed that the guide bar is displayed on the TV screen. The application 101 programs the guide bar through the graphic library 102a of the OSD unit 102 and outputs the programmed value to the OSD processor 102c through the OSD interface 102b. The OSD processor 102c sets the programmed value at a corresponding position of the OSD memory to depict the guide bar to be actually displayed on the TV screen. Thereafter, the value of the OSD memory is displayed on the screen without any change, to thereby display the guide bar in OSD form, as shown in FIG. 4.

Meanwhile, the engine 103 displays a broadcasting signal received in real time on the TV screen under the control of the application 101 or stores it in the HDD 106. In addition, the engine displays a broadcasting signal reproduced from the HDD 106 on the TV screen. Specifically, the channel decoder 201 removes various noises generated on a channel from a broadcasting signal inputted through the channel (the air, a cable or a satellite) and outputs the signal to the video processor 202 and the program guide extractor 203. The video processor 202 extracts video information, that is, audio data and video data, from the broadcasting signal outputted from the channel decoder 201, decodes them, and outputs them to the display device. Accordingly, the user can watch broadcast received in real time.

The program guide extractor 203 detects additional information, i.e., program guide information, from the broadcasting signal outputted from the channel decoder 201 and stores it in the storage 205 through the controller 204. The program guide information provides information about the program of the clipping region when the clipping function is carried out.

The controller 204 memorizes position information and time information related with the clipping region when the user sets the clipping region, to control variation in the contents of the file system 104.

The file system 104 is a data structure for managing information of files stored in the HDD 106. When a variation in data stored in the HDD 106 is generated, the file system is updated under the control of the controller 204. When a broadcasting signal is stored in the HDD 106 in the event of reservation recording or prompt recording or according to the time shift function, the file system 104 handles the stored broadcasting signal as a file, gives a name to the file and manages the position of the file in the HDD 106 and time information related with the file. Additionally, even when a clipping region is set and the broadcasting signal of the clipping region is stored in the HDD 106, the file system 204 gives a file name to the file meaning the broadcasting signal and manages position and time information of the file. Here, when at least two clipping regions are set, the file system can generate a file name with respect to each of the clipping regions or it can create only one file name for them. In a preferred embodiment of the invention, one file name is generated for one clipping region.

When the user selects a specific recorded file name through a menu screen, the controller 204 reads data stored in a corresponding position of the HDD 106 with reference to file information of the file system 104, to display the data on the TV screen through the video processor 202. Here, if the guide bar is being displayed through the OSD unit 102, the state of the broadcasting signal being reproduced on the screen is displayed on the guide bar through linkage of the OSD unit 102 and the engine 103.

Figure 3:
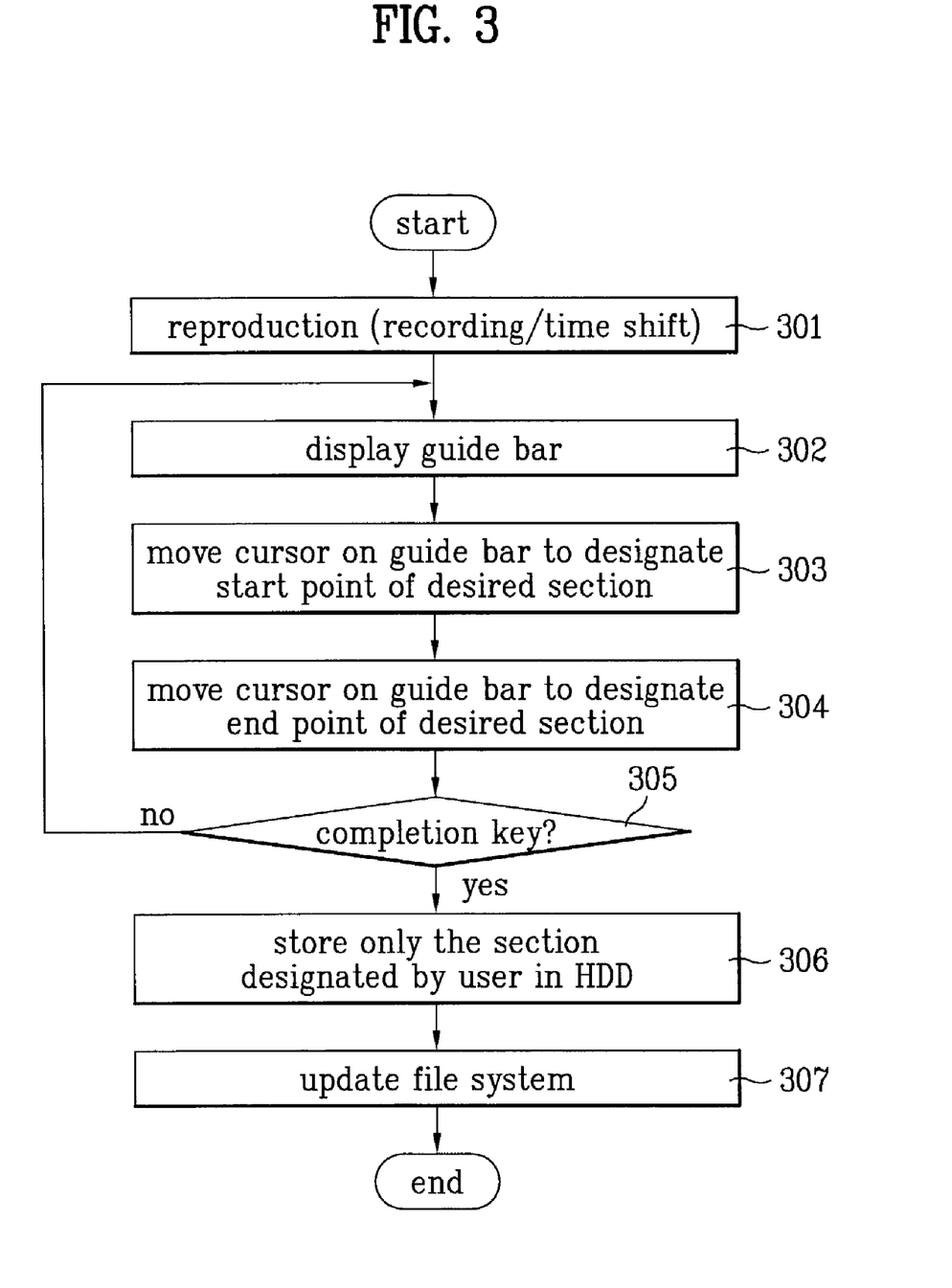
FIG. 3 is a flow chart showing a clipping method according to the present invention.

FIG. 3 is a flow chart for explaining a clipping method in the event of reproduction. Here, reproduction has two meaning. One is reproduction of a program recorded in the HDD 106 and the other is reproduction of a time-shifted program. The most distinctive difference between the time shift and recording is that contents are automatically deleted from the HDD 106 once they are reproduced in case of the time shift while the contents are continuously being stored in the HDD 106 even when they are reproduced once. The user can easily recognize the difference between the two kinds of reproductions when the guide bar is displayed in different colors respectively for the case of reproducing a recorded program and the case of reproducing a time-shifted program.

Referring to FIG. 3, when reproduction of a specific file stored in the HDD 106 is selected (step 301) and the guide bar is displayed as shown in FIG. 4 through the OSD unit 102, the user can execute the clipping function through the key input unit 100 (step 302). Here, the guide bar can be automatically displayed if the system requires or it can be displayed at the user's request. In addition, it is also possible that the guide bar is inactivated in an icon form after a lapse of predetermined time and then activated again according to the user's choice if required.

In the above-described reproduced state, the user can designate the start position and completion position of a desired clipping region using a key allocated for clipping (for example, recording key) when contents he wants to store in the HDD 106 are displayed (steps 303 and 304). With a reproduced file that has a five-minute long advertisement at the beginning and end parts thereof, respectively, for instance, if the user wants to set a portion of the reproduced file, other than the advertisement parts, as a clipping region, he moves the cursor to a position on the guide bar, corresponding to the point five-minute distant from the start point of the reproduced file using directions keys of the remote control and pushes the recording key, to thereby designate the start point of the clipping region. Then, the user moves the cursor to a point five-minutes before the end point of the reproduced file and pushes the recording key, to thereby designate the completion point of the clipping region. By doing so, one clipping region is set. Another clipping region can be set in the reproduced file by repeating the aforementioned process.

Otherwise, while normally watching the reproduced file, the user can designate the start point and completion point using the recording key whenever contents he wants to clip are displayed, thereby setting at least one clipping region.

The set clipping region is indicated in a color different from the original color of the guide bar to allow the user to easily recognize the clipping region.

In case that, after at least one clipping region is set in the current reproduced file, the user does not want to set a clipping region any more, he just pushes a completion key (step 305). When the completion key is inputted, only the broadcasting signal of the clipping region designated by the user is stored in the HDD 106 and broadcasting signals excluded from the clipping region are deleted from the HDD 106 (step 306). Simultaneously, the file system 104 corrects information about the reproduced file, gives a new name to the clipping region, and manages position information and time information about the file (step 307). Here, the position information related with the clipping region can be transmitted to the file system 104 whenever one clipping region is set. Otherwise, upon completion of setting clipping regions with respect the reproduced file, position information items related with the clipping regions can be transmitted at once.

When the broadcasting signal of the clipping region is stored in the HDD 106, the invention can apply the same method for the recorded program and time-shifted program or apply different methods for them. That is, after clipping regions for the recorded program and time-shifted program are set and the completion key is inputted, the broadcasting signals of the clipping regions can be directly stored in the HDD 106 or they can pass through a confirmation process to be stored in the HDD 106.

For example, only the broadcasting signal of the clipping region with respect to the time-shifted program is directly stored in the HDD 106 when the clipping completion key is inputted. In case of the recorded program, only the broadcasting signal of the clipping region passes through the confirmation process and then is stored in the HDD 106. The confirmation process can employ various methods and it can be varied depending on a system designer. One of the methods is constructed in such a manner that items such as "edit", "cancel edition", "cancel" and the like are displayed on the menu screen when the clipping completion key is inputted and a user selects one of the items to control the operation corresponding to the selected item. When the user selects "edit", for instance, only the broadcasting signal of the clipping region set with respect to the reproduced file is stored in the HDD 106 and broadcasting signals excluded from the clipping region are deleted from the HDD 106. When "cancel edition" is selected, which means cancellation of the clipping function, the process returns to the recording state. When "cancel" is selected, the process returns to the clipping region setting state so as to set a new clipping region or correct the clipping region previously set. The above-described confirmation process is merely exemplary and is not limited to the aforementioned example.

Moreover, a program broadcasting in real time can be recorded through the clipping function. Specifically, when the user wants to record a portion of the real-time broadcasting program while he watching it, with the guide bar being displayed, he pushes the recording key at that portion. Then, while he is continuously watching the program, he pushes the recording key again at a portion he does not want to record, thereby setting a clipping region. The clipping region is displayed on the guide bar and, when the clipping completion key is inputted, only the broadcasting signals of the clipping region are stored in the HDD 106. Simultaneously, the file system 104 is updated.

Figure 5:
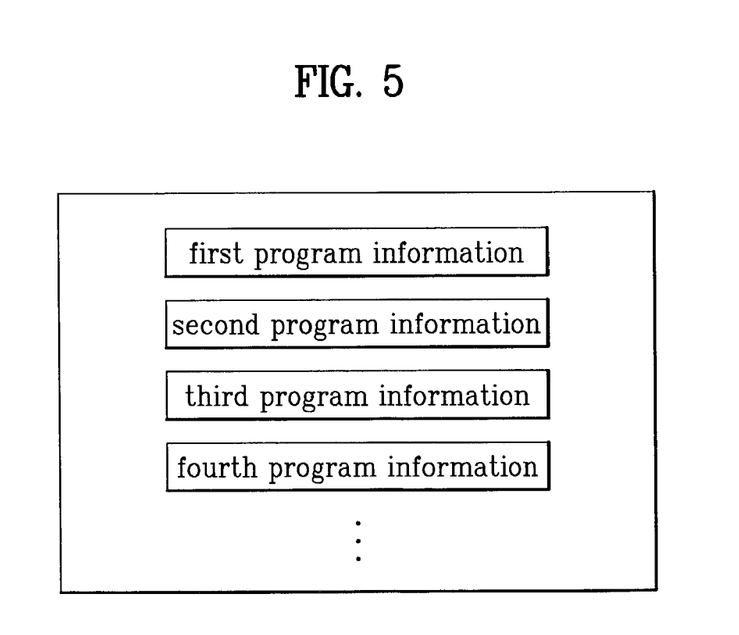
FIG. 5 illustrates an example of a list of file information stored in an HDD according to the present invention.

Upon completion of the aforementioned process, program list information about files stored in the HDD 106 is displayed on the TV screen through the file system 104, as shown in FIG. 5. At this time, file information about the clipping region is also displayed. Specifically, information about a first program, such as file name, time and the like, is displayed in a first program information space, and information about a second program, such as file name, time and the like, is displayed in a second program information space.

The user can select programs he wants to merge while watching the program information displayed on the list and determine merging order of the selected programs. The merging order means order of reproducing programs merged into one program. For example, programs can be merged in the order of first, second, third and fourth programs, or first, third, second and fourth programs. The merging order depends on the user. Upon completion of merging, the user can decide a new title for the newly merged program.

According to the system and method for recording broadcasting programs of the present invention, described above, the user can select a portion of a recorded program and store only the selected portion in the HDD. This prevents the HDD from being unnecessary wasted. Furthermore, the user can easily perform the clipping function in such a manner that he pushes the clipping start key and completion key at desired positions on the guide bar to set a clipping region. Moreover, even for a time-shifted program, the user stores a portion of the program in the HDD through the clipping function so that he can reproduce even the time-shifted program whenever he wants to watch it.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A broadcasting program recording system, comprising:
   a storage medium for storing a corresponding broadcasting signal when a recording or time shift function is set;
   a key input unit through which a user inputs a clipping start key and a clipping completion key at a start position and end position of a clipping region, respectively, in order to set the clipping region in a broadcasting signal being displayed;
   an application for controlling the recording system in order to perform operations according to commands input on the key input unit;
   an OSD (on-screen display) unit for displaying a guide bar in an OSD form on a predetermined position of a screen under the control of the application in order to display a state of the broadcasting signal currently being displayed on the screen, the clipping region being distinctively set and indicated on the guide bar;
   an engine for processing a broadcasting signal reproduced from the storage medium or a real-time broadcasting signal to display the processed signal under the control of the application, the engine controlling broadcasting signals of the clipping region to be stored in the storage medium when the user sets the clipping region through the guide bar, the engine detecting program guide information of the clipping region from the broadcasting signal and providing the detected program guide information to the OSD unit; and
   a file system for managing information about files stored in the storage medium, the file system generating a new file name and correcting existing file information when the broadcasting signals of the clipping region have been stored,
   wherein the OSD unit displays the program guide information on the guidebar.

2. The system as claimed in claim 1, wherein the user uses the key input unit to move a cursor to a desired clipping start point on the guide bar and inputs the clipping start key for clipping, and then to move the cursor to a desired clipping completion point and inputs the clipping completion key for clipping, to thereby set the clipping region, the user setting a plurality of clipping regions by repeating the above-described process, the guide bar being displayed, being linked with the displayed broadcasting signal.

3. The system as claimed in claim 1, wherein the OSD unit displays the clipping region and other regions in different colors under the control of the application, to allow the user to recognize the clipping region.

4. The system as claimed in claim 1, wherein the clipping start key and clipping completion key for clipping are allocated to one key of the key input unit and the clipping region is set by toggling the one key.

5. The system as claimed in claim 1, wherein the clipping start key and clipping completion key for clipping are respectively allocated to different keys of the key input unit, to set the clipping region.

6. The system as claimed in claim 1, wherein the broadcasting signal corresponding to the clipping region is a broadcasting signal that is stored in the storage medium through the recording function and then reproduced.

7. The system as claimed in claim 1, wherein the broadcasting signal corresponding to the clipping region is a broadcasting signal that is stored in the storage medium through the time shift function and then reproduced.

8. The system as claimed in claim 1, wherein the broadcasting signal corresponding to the clipping region is a broadcasting signal received through a channel in real time.

9. The system as claimed in claim 1, wherein the engine deletes broadcasting signals excluded from the clipping region, among reproduced broadcasting signals, when the displayed broadcasting signal is a broadcasting signal stored in the storage medium through the recording function and, simultaneously, updates file information of the file system.

10. The system as claimed in claim 1, wherein the OSD unit displays file information stored in the storage medium in a list form with reference to the file system under the control of the application, and the user uses the key input unit to select files the user wants to merge into one file from files of the list and to determine a merging order of the selected files.

11. The system as claimed in claim 1, wherein the key input unit transmits input commands either wirelessly to the application.

12. The system as claimed in claim 1, wherein the OSD unit further displays identification information for a plurality of different programs on the guide bar such that the user can select a plurality of clipping regions within the plurality of different programs.

13. A method of recording broadcasting programs of a digital TV system including a storage medium for storing a corresponding broadcasting signal when a recording or shift time function is set and a file system for managing information of files stored in the storage medium, the method comprising:
   (a) displaying a guide bar on a predetermined position on a TV screen of the digital TV system in an OSD (on-screen display) form and indicating a state of a broadcasting signal currently being displayed on the TV screen;
   (b) inputting, by a user, a clipping start key and a clipping completion key for clipping at a desired clipping start point and an end point on the guide bar, respectively, to set a clipping region;
   (c) discriminating the clipping region from other regions on the guide bar when the clipping region is set in the step (b);
   (d) detecting program guide information of the clipping region from the broadcasting signal and displaying the program guide information on the guide bar; and (e) storing the broadcasting signal of the clipping region in the storage medium and updating file information of the file system when the clipping region is set in the step (b).

14. The method as claimed in claim 13, wherein, in the step (b), the user moves a cursor to a desired clipping start point on the guide bar and inputs the clipping start key for clipping, and then moves the cursor to a desired clipping completion point and inputs the clipping completion key for clipping, to thereby set the clipping region, the user setting a plurality of clipping regions by repeating the above-described process, the guide bar being displayed, being linked with the displayed broadcasting signal.

15. The method as claimed in claim 13, wherein, in the step (b), the user inputs the clipping start key for clipping when the cursor is placed at a desired clipping start point, and inputs the clipping completion key for clipping when the cursor is located at a desired clipping completion point, to thereby set the clipping region, the user setting a plurality of clipping regions by repeating the above-described process, the guide bar being displayed, being linked with the displayed broadcasting signal.

16. The method as claimed in claim 13, wherein the step (c) differentiates a color of the clipping region from a color of other regions on the guide bar, to allow the user to recognize the clipping region.

17. The method as claimed in claim 13, wherein the broadcasting signal of the clipping region is a broadcasting signal that is stored in the storage medium through the recording function and then reproduced, and the reproduced broadcasting signal is continuously being stored in the storage medium when the clipping function is cancelled.

18. The method as claimed in claim 17, wherein broadcasting signals excluded from the clipping region, among reproduced broadcasting signals, are deleted from the storage medium and, simultaneously, the file system is updated.

19. The method as claimed in claim 13, wherein the broadcasting signal of the clipping region is a broadcasting signal that is stored in the storage medium through the time shift function and then reproduced, and the reproduced broadcasting signal is deleted from the storage medium when the clipping region is not set.

20. The method as claimed in claim 13, wherein the broadcasting signal of the clipping region is a broadcasting signal received through a channel in real time.

21. The method as claimed in claim 13, further comprising a displaying file information stored in the storage medium in a list form with reference to the file system, and selecting, by the user, the files the user wants to merge into one file from files of the list and determining a merging order of the selected files.

22. The method as claimed in claim 13, wherein the displaying step further displays identification information for a plurality of different programs on the guide bar such that the user can select a plurality of clipping regions within the plurality of different programs.

23. A method of recording broadcasting programs of a digital TV system including a storage medium for storing a corresponding broadcasting signal when a recording or shift time function is set and a file system for managing information of files stored in the storage medium, the method comprising:

(a) displaying a guide bar on a predetermined position of a TV screen in an OSD (on-screen display) form and indicating a state of a broadcasting signal currently being displayed on the TV screen, wherein the guide bar displays the detected program guide information when the clipping region is set;

(b) inputting, by a user, a clipping start key and a clipping completion key for clipping at a desired clipping start point and a completion point on the guide bar, respectively, to set a clipping region, if the user wants to set the clipping region when a broadcasting signal stored in the storage medium is reproduced, the user repeating this process to set a plurality of clipping regions;

(c) discriminating a color of the clipping region from a color of other regions on the guide bar when the clipping region is set in the step (b); and (d) detecting program guide information of the clipping region from the broadcasting signal and displaying the program guide information on the guide bar; and (e) storing the broadcasting signal of the clipping region in the storage medium and updating the file information of the file system when the clipping region is set in the step (b)

24. The method as claimed in claim 23, wherein, in the step (b), the broadcasting signal that is stored in the storage medium and then reproduced is a broadcasting signal previously stored through the recording function, a broadcasting signal excluded from the clipping region, among the reproduced broadcasting signal, is deleted from the storage medium, and the reproduced broadcasting signal is continuously being stored in the storage medium when the clipping function is cancelled.

25. The method as claimed in claim 23, wherein the broadcasting signal that is stored in the storage medium and then reproduced is a broadcasting signal stored through the time shift function, and the reproduced broadcasting signal is deleted from the storage medium when the clipping region is not set.

26. The method as claimed in claim 23, wherein the displaying step further displays identification information for a plurality of different programs on the guide bar such that the user can select a plurality of clipping regions within the plurality of different programs.

* * * * *